United States Patent
Dalsgaard et al.

(10) Patent No.: US 9,820,286 B2
(45) Date of Patent: Nov. 14, 2017

(54) SECONDARY CELL ACTIVATION DELAY INDICATION

(71) Applicant: Nokia Technologies Oy, Espoo (FI)

(72) Inventors: Lars Dalsgaard, Oulu (FI);
Jussi-Pekka Koskinen, Oulu (FI);
Jarkko Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/435,792

(22) PCT Filed: Nov. 13, 2013

(86) PCT No.: PCT/FI2013/051071
§ 371 (c)(1),
(2) Date: Apr. 15, 2015

(87) PCT Pub. No.: WO2014/076371
PCT Pub. Date: May 22, 2014

(65) Prior Publication Data
US 2015/0257163 A1  Sep. 10, 2015

Related U.S. Application Data

(60) Provisional application No. 61/725,992, filed on Nov. 13, 2012.

(51) Int. Cl.
*H04W 72/08* (2009.01)
*H04W 48/20* (2009.01)
(Continued)

(52) U.S. Cl.
CPC ............ *H04W 72/08* (2013.01); *H04L 5/001* (2013.01); *H04L 5/0098* (2013.01); *H04W 8/02* (2013.01);
(Continued)

(58) Field of Classification Search
CPC ..... H04W 72/04; H04W 72/08; H04W 24/10; H04W 24/02; H04W 48/20;
(Continued)

(56) References Cited

U.S. PATENT DOCUMENTS

2003/0224774 A1* 12/2003 Cheng ................... H04L 1/1854
455/422.1
2010/0111068 A1* 5/2010 Wu ........................ H04L 1/1812
370/345
(Continued)

FOREIGN PATENT DOCUMENTS

WO  2011053055 A2  5/2011
WO  2011/157364 A1  12/2011
(Continued)

OTHER PUBLICATIONS

International Search Report and Written Opinion received for corresponding Patent Cooperation Treaty Application No. PCT/FI2013/051071, dated Feb. 12, 2014, 14 pages.
(Continued)

*Primary Examiner* — Kashif Siddiqui
(74) *Attorney, Agent, or Firm* — Squire Patton Boggs (US) LLP

(57) ABSTRACT

Methods and apparatus, including computer program products, are provided for secondary cells configured for carrier aggregation. In one aspect there is provided a method. The method may include receiving, at a user equipment, an indication from a network to activate a secondary cell configured for carrier aggregation, the indication comprising at least one of a secondary cell activation command or a secondary cell configuration; and sending, by the user equipment, at least one of a secondary cell activation time or a secondary cell activation delay to the network. Related apparatus, systems, methods, and articles are also described.

15 Claims, 5 Drawing Sheets

(51) Int. Cl.
  *H04W 8/02* (2009.01)
  *H04W 72/04* (2009.01)
  *H04L 5/00* (2006.01)
  *H04W 24/02* (2009.01)
  *H04W 88/08* (2009.01)

(52) U.S. Cl.
  CPC ........... *H04W 24/02* (2013.01); *H04W 48/20* (2013.01); *H04W 72/042* (2013.01); *H04L 5/0023* (2013.01); *H04L 5/0085* (2013.01); *H04W 88/08* (2013.01)

(58) Field of Classification Search
  CPC ..... H04W 72/042; H04W 88/08; H04W 8/02; H04L 5/001; H04L 5/0023; H04L 5/0085; H04L 5/0098
  USPC .......................... 455/450, 452.2, 451, 452.1
  See application file for complete search history.

(56) References Cited

U.S. PATENT DOCUMENTS

| | | | |
|---|---|---|---|
| 2011/0014917 A1* | 1/2011 | Wager | H04W 36/0061 455/438 |
| 2011/0243106 A1 | 10/2011 | Hsu et al. | |
| 2012/0176926 A1* | 7/2012 | Jang | H04W 24/02 370/252 |
| 2012/0194947 A1 | 8/2012 | Nakashimo | |
| 2012/0282942 A1 | 11/2012 | Uusitalo et al. | |
| 2013/0194947 A1* | 8/2013 | Ehsan | H04L 5/0098 370/252 |

FOREIGN PATENT DOCUMENTS

| | | |
|---|---|---|
| WO | 2012023839 A2 | 2/2012 |
| WO | 2012/129764 A1 | 10/2012 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331, V11.1.0, Sep. 2012, pp. 1-325.

"3rd Generation Partnership Project; Technical Specification Group Radio Access Network; Evolved Universal Terrestrial Radio Access (E-UTRA); Multiplexing and channel coding(Release 11)", 3GPP TS 36.212, V11.0.0, Sep. 2012, pp. 1-79.

"CA RRM Adhoc Minutes", 3GPP TSG RAN WG4 Meeting #64bis, R4-125908, Agenda item: 6.1.3.1, Renesas Mobile Europe Ltd., Oct. 8-12, 2012, 5 pages.

"Way Forward on SCell Activation Delay", 3GPP TSG-RAN WG4 Meeting #64bis, R4-126025, Agenda Item: 6.1.3.1, Ericsson, Oct. 8-12, 2012, 4 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 11)", 3GPP TS 36.300, V11.3.0, Sep. 2012, pp. 1-205.

"3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321, V11.0.0, Sep. 2012, pp. 1-55.

"3rd Generation Partnership Project;Technical Specification Group Radio Access Network;Evolved Universal Terrestrial Radio Access (E-UTRA);LTE physical layer; General description(Release 12)", 3GPP TS 36.201, V12.2.0, Mar. 2015, pp. 1-14.

"3rd Generation Partnership Project;Technical Specification Group Radio Access Network;Evolved Universal Terrestrial Radio Access (E-UTRA);Physical channels and modulation(Release 12)", 3GPP TS 36.211, V12.5.0, Mar. 2015, pp. 1-136.

"3rd Generation Partnership Project;Technical Specification Group Radio Access Network;Evolved Universal Terrestrial Radio Access (E-UTRA);Physical layer procedures(Release 12)", 3GPP TS 36.213, V12.5.0, Mar. 2015, pp. 1-239.

"3rd Generation Partnership Project;Technical Specification Group Radio Access Network;Evolved Universal Terrestrial Radio Access (E-UTRA);Physical layer; Measurements(Release 12)", 3GPP TS 36.214, V12.2.0, Mar. 2015, pp. 1-17.

Extended European Search Report received for corresponding European Patent Application No. 13854264.2, dated May 25, 2016, 8 pages.

"Proposals for Completion of Work on Scell Activation Timing", 3GPP TSG-RAN WG4 Meeting #65, R4-126464, Agenda: 6.1.3.1, Renesas Mobile Europe Ltd, Nov. 12-16, 2012, 4 pages.

"Discussion on Scell Activation/Deactivation", 3GPP TSG-RAN2 #80, R2-125429, Agenda: 6.1, MediaTek Inc, Nov. 12-16, 2012, 5 pages.

* cited by examiner

SECONDARY CELL ACTIVATION DELAY INDICATION

RELATED APPLICATION

This application was originally filed as Patent Cooperation Treaty Application No. PCT/FI2013/051071filed Nov. 13, 2013 which claims priority benefit to U.S. Provisional Patent Application No. 61/725,992, filed Nov. 13, 2012.

FIELD

The subject matter disclosed herein relates to wireless communications.

BACKGROUND

A user equipment, such as a mobile wireless devices and the like, may be mobile in the sense that it may enter and/or exit a plurality of cells that serve the user equipment with access to and from the public land mobile network. For example, when the user equipment enters a cell, the network may send a command to the user equipment to perform a handover to that cell in order to couple to the serving cell. The user equipment may then proceed to be configured to measure the serving cell and/or other cells, report measurements of the serving cell and/or other cells to the network, and the like. After having executed the handover, the user equipment may become operational on the serving cell and thus user data can flow to and from the network.

Some user equipment may be configured to operate using carrier aggregation. Carrier aggregation refers to using one or more portions of the radio frequency spectrum (also referred to as spectrum chunks) to carry data between the user equipment and the network—increasing thus data throughput, when activated by the network. These spectrum chunks may be contiguous or non-contiguous and may be symmetric or asymmetric (for example, a different quantity of spectrum chunks allocated to the uplink and downlink). Typically, one of the spectrum chunks is designated a primary cell, serving as an anchor carrier, while additional spectrum chunks are referred to as secondary cells (Scells).

SUMMARY

Methods and apparatus, including computer program products, are provided for secondary cells configured for carrier aggregation.

In some example embodiments, there is provided a method. The method may include receiving, at a user equipment, an indication from a network, the indication comprising at least one of a secondary cell activation command or a secondary cell configuration; and sending, by the user equipment, at least one of a secondary cell activation time or a secondary cell activation delay to the network.

In some example embodiments, one of more variations may be made as well as described in the detailed description below and/or as described in the following features. The sending may further include sending the at least one of the secondary cell activation time or the secondary cell activation delay in response to the received indication. The sending may further include sending one or more capability messages including the at least one of the secondary cell activation time or the secondary cell activation delay. The sending may further include sending one or more radio resource control messages including the at least one of the secondary cell activation time or the secondary cell activation delay. The sending may further include sending, during the establishment of a carrier aggregation session, the at least one of the secondary cell activation time or the secondary cell activation delay. The sending may further include sending, for each secondary cell, the at least one of the secondary cell activation time or the secondary cell activation delay.

In some example embodiments, there may be provided a method. The method may include receiving a channel measurement report and determining a receipt of the channel measurement report to indicate a secondary cell activation at a user equipment and a readiness at the user equipment to access the activated secondary cell.

In some example embodiments, one of more variations may be made as well as described in the detailed description below and/or as described in the following features. The channel measurement report may be received from a user equipment. The channel measurement report may include a channel quality indicator report. A base station or a network node may perform the receiving and the determining.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Figure 1:
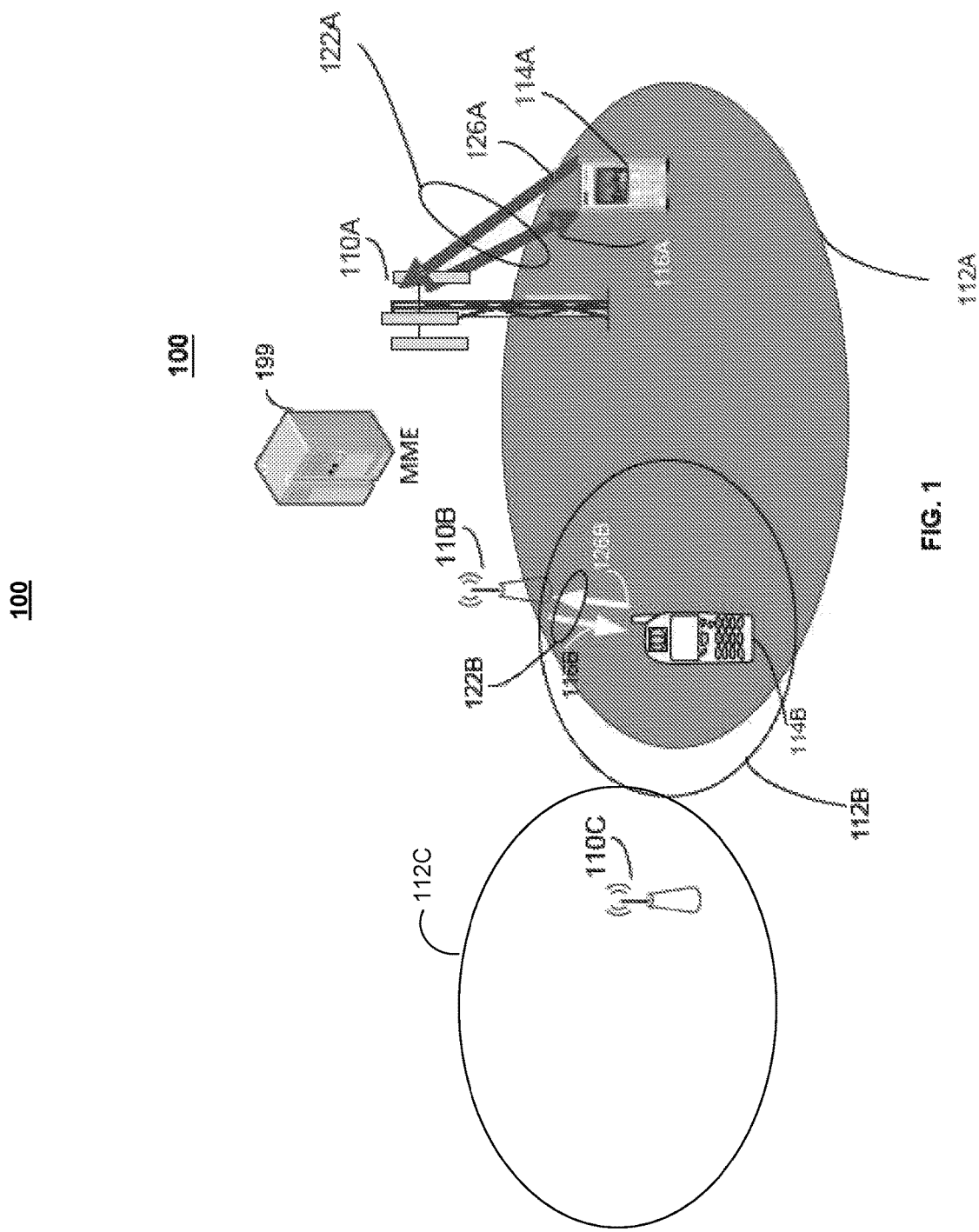
FIG. 1 depicts an example of a system, in accordance with some example embodiments.

Like labels are used to refer to same or similar items in the drawings.

DETAILED DESCRIPTION

When a user equipment receives a secondary cell (for example, Scell and hereinafter referred to as an Scell) activation command, the secondary cell may become active at a later time, such as one or more transmission time intervals (TTI) n+8 later, at which time the network and the user equipment consider the secondary cell active, and after a subsequent delay, the secondary cell may be considered operational. The time when the cell becomes active (referred to herein as "secondary cell activation time") and the delay when the cell becomes operational (referred to herein as the "Scell cell operational delay" and/or "Scell activation delay") may be specified via a so-called "relaxed" value in a standard or a specification to accommodate a wide variety of user equipment, including devices. When this is the case however, the network may not know a given user equipment's actual Scell activation time (for example, the time between the Scell activation command and when the Scell is active) or the Scell activation delay (for example, the time between when the Scell is active and the Scell is operational). For example, if a given user equipment has a faster Scell activation time or a shorter delay than the specified requirements, the network may not be able to take advantage of the shorter Scell activation time or Scell activation delay.

Moreover, when the Scell activation time and/or Scell activation delay is specified to be relatively slow to accommodate a wide variety of user equipment, this slow Scell activation time and/or Scell activation delay may also adversely impact carrier aggregation. As noted, carrier aggregation refers to using a plurality of radio frequency spectrum chunks to carry data between the user equipment and the network—increasing thus data throughput, when activated by the network. However, if the Scell activation delay is too long or unclear due to a relaxed specification requirement, this may cause inefficient carrier aggregation use and even missed opportunities for carrier aggregation. Although the previous example refers to carrier aggregation, aspects of the subject matter disclosed herein may be applied to systems not implementing carrier aggregation as well.

In some example embodiments, the subject matter disclosed herein relates to a user equipment signaling a Scell activation time and/or a Scell activation delay to the network. For example, each user equipment may signal to the network a value representative of the Scell activation time and/or or a value representative of a Scell activation delay to inform the network when the user equipment at the Scell will be active and/or when the Scell will be considered operational.

Before providing additional examples, the following provides an example of a system framework in which some of the example embodiments described herein may be implemented.

FIG. 1 depicts a system 100 according to some example embodiments. System 100 may include one or more user equipment, such as user equipment 114A-B, and one or more access points, such as base stations 110A-C. In some example embodiments, base station 110A may serve a cell, such as macrocell 112A, and base station 110B may serve a small cell, such as a picocell or a femtocell 112B, although base stations 110A-B may serve other types of cells as well. In other examples the cells (that being either macro cells or small cells) may be co-located. Moreover, the base stations 110A-C may have wired and/or wireless backhaul links to other network nodes, such as a mobility management entity (MME) 199, other base stations, a radio network controller, a core network, a serving gateway, and the like.

In some example embodiments, user equipment 114A-B may be implemented as a mobile device and/or a stationary device. The user equipment 114A-B are often referred to as, for example, mobile stations, mobile units, subscriber stations, wireless terminals, tablets, smart phones, devices, or the like. A user equipment may be implemented as, for example, a wireless handheld device, a wireless plug-in accessory, or the like. In some example embodiments, the user equipment may include one or more processors, one or more computer-readable storage medium (for example, memory, storage, and the like), one or more radio access components (for example, a modem, a transceiver, and the like), and/or a user interface. The computer readable medium may include code which when executed by a processor provides one or more applications.

In some example embodiments, the user equipment 114A-B may be implemented as multi-mode user devices configured to operate using a plurality of radio access technologies, although a single-mode device may be used as well. For example, user equipment 114A-B may be configured to operate using a plurality of radio access technologies including one or more of the following: Long Term Evolution (LTE), wireless local area network (WLAN) technology, such as 802.11 WiFi and the like, Bluetooth, Bluetooth low energy (BT-LE), near field communications (NFC), and any other radio access technologies. Moreover, the user equipment 114A-B may be configured to have established connections to access points using a plurality of the radio access technologies.

The base stations 110A-C may, in some example embodiments, be implemented as an evolved Node B (eNB) type base station, although other types of radio access points may be implemented as well. When the evolved Node B (eNB) type base station is used, the base stations, such as base stations 110A-C, may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards). The base stations 110A-C may also be configured to serve cells using a WLAN technology, such as WiFi (for example, the IEEE 802.11 series of standards), as well as any other radio access technology capable of serving a cell.

In some example embodiments, system 100 may include access links, such as links 122A-B. The access links 122A may include a downlink 116A for transmitting to the user equipment 114A and an uplink 126A for transmitting from user equipment 114A to the base station 110A. The downlink 116A may comprise a modulated radio frequency carrying information, such as user data, radio resource control (RRC) messages, Medium Access Control (MAC) messages, activation commands, and the like, to the user equipment 114A, and the uplink 126A may comprise a modulated radio frequency carrying information, such as user data, RRC messages, MAC messages, user equipment capabilities reporting, channel quality reports, Scell activation commands, Scell activation times, Scell activation delays, measurement reports of a serving cell, and the like, from the user equipment 114A to base station 110A. Access links 122B may include downlink 116B for transmitting from the base station 110B to user equipment 114B, and uplink 126B for transmitting from user equipment 114B to the base station 110B.

The downlink 116A and uplinks 126A may, in some example embodiments, each represent a radio frequency (RF) signal. The RF signal may, as noted above, carry data, such as voice, video, images, Internet Protocol (IP) packets, control information, and any other type of information and/or messages. For example, when LTE is used, the RF signal may use OFDMA. OFDMA is a multi-user version of orthogonal frequency division multiplexing (OFDM). In OFDMA, multiple access is achieved by assigning, to individual users, groups of subcarriers (also referred to as subchannels or tones). The subcarriers are modulated using BPSK (binary phase shift keying), QPSK (quadrature phase shift keying), or QAM (quadrature amplitude modulation), and carry symbols (also referred to as OFDMA symbols) including data coded using a forward error-correction code. The subject matter described herein is not limited to application to OFDMA systems, LTE, LTE-Advanced, or to the noted standards, specifications, and/or technologies. Furthermore, the downlink 116B and uplink 126B may be configured using standards and/or technologies similar to those noted with respect to downlink 116A and uplink 126A, although downlink 116B and uplink 126B may use different standards or technologies as well, such as WiFi, WiBro, and/or another other wireless technology. In addition, each access link may be unidirectional or bidirectional.

Although FIG. 1 depicts access links between certain user equipment and certain base stations, the user equipment and base stations may have additional links to other devices as well. Furthermore, although FIG. 1 depicts a specific quantity and configuration of base stations, cells, and user equipment, other quantities and configurations may be implemented as well.

Figure 2:
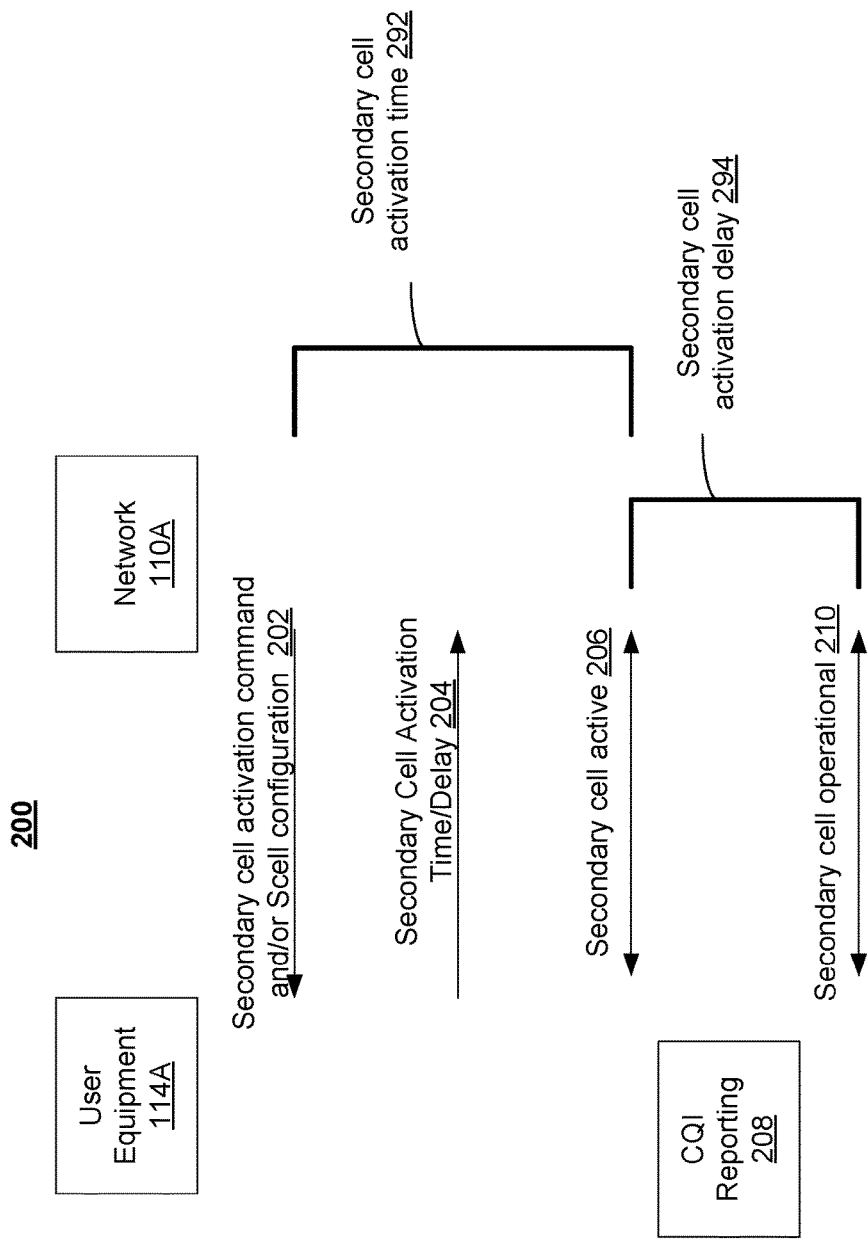
FIG. 2 depicts example of a process for signaling serving cell times and/or delays to the network, in accordance with some example embodiments.

FIG. 2 depicts an example process 200 for signaling a user equipment's Scell activation time and/or Scell activation delay to the network, in accordance with some example embodiments.

At 202, user equipment 114A may receive a Scell activation command or a Scell configuration from a node in the network, such as base station 110A, in accordance with some example embodiments. For example, the user equipment 114A may enter secondary cell 112A and a node in the network, such as base station 110A, may send a Scell activation command to user equipment 114A. In addition or alternatively, the user equipment 114A may receive from network 110A one or more radio resource control messages including the Scell configuration at 202.

At 204, the user equipment 114A may send to the network 110A a Scell activation, operation (delay) time, and/or a Scell delay, in accordance with some example embodiments. For example, user equipment 114A may send, in response to the configuration and/or activation command received at 202, a Scell activation time and/or a Scell activation delay. In some example embodiments, the Scell activation time/delay 292 may represent a time before the Scell 112A is active and/or operational. In some example embodiments, the Scell delay time 294 may represent a time before the Scell 112A is operational. In some example embodiments, the Scell activation time and/or the Scell activation delay may be represented in terms of terminal timing intervals (TTI), although these times/delays may be represented in other ways as well. When the cell is active (for example, during the Scell delay time 294), the user equipment 114A may measure and send to network 110A measurement reports, such as channel quality indicator reports, of the serving cell.

Figure 3:
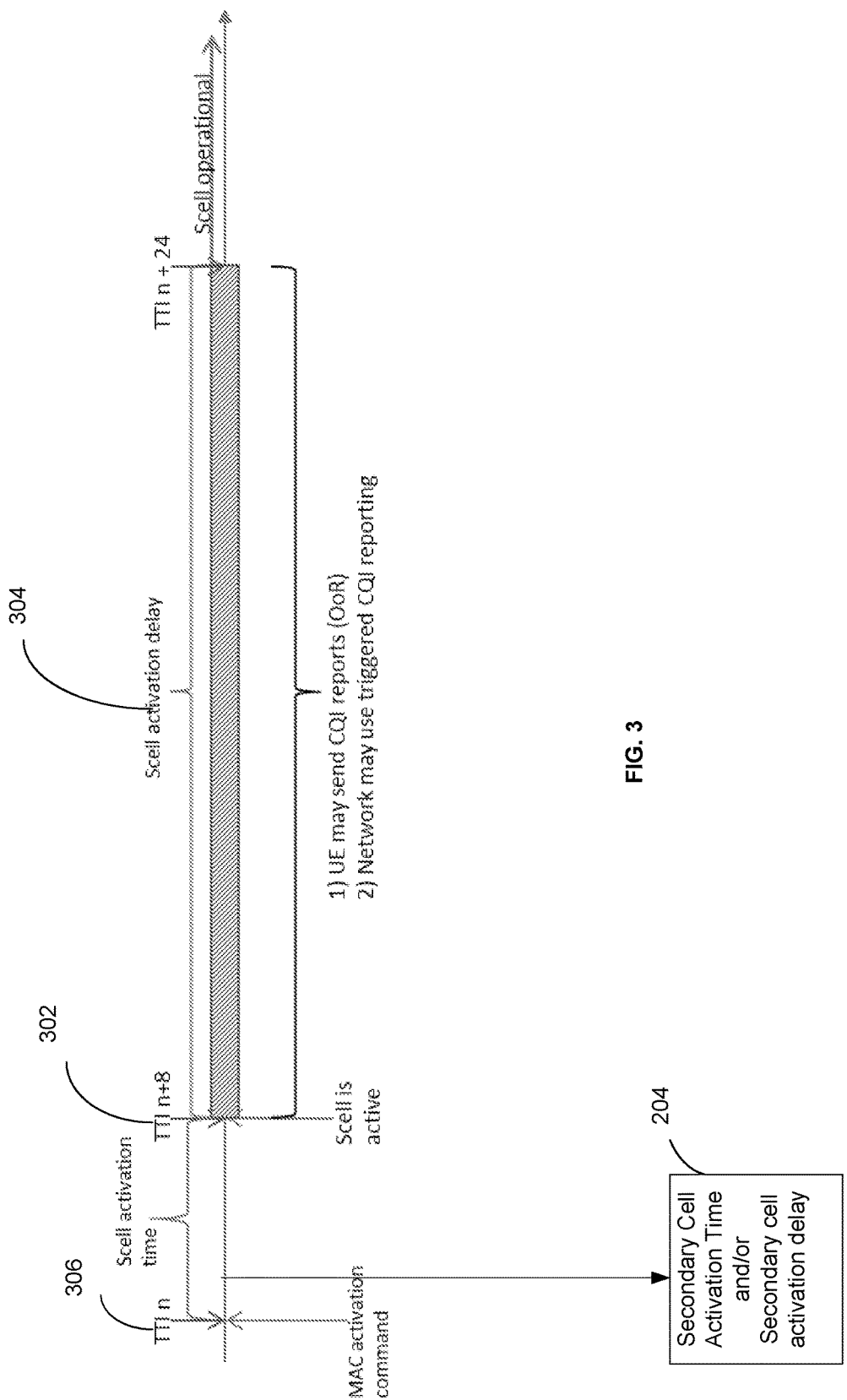
FIG. 3 depicts an example of the times and delays, in accordance with some example embodiments.

FIG. 3 depicts an example representation of the Scell activation time 302 and the Scell activation delay 304, in accordance with some example embodiments. Referring to FIG. 3, Scell activation time is at terminal time interval (TTI) n+8, which represents in this example 8 TTIs from when the activation command is received at 306. The Scell activation delay is at terminal for example at transmission time interval (TTI) n+24, which represents in this example 24 TTIs from when the activation command is received at 306. As noted, the user equipment 114A may send to the network 110A the values of the Scell activation time 302 and the Scell activation delay 304. And, the time and/or delay may, as noted, be sent as TTI values (for example, 8 for the Scell activation time 302 and 24 for the Scell activation delay 304), a value representative of those TTI values (for example, an index which can be used to look up the TTI values), and/or in any other format.

Referring again to FIG. 2, in some example embodiments, the Scell activation time and/or Scell activation delay may be sent to the network 110A, when the user equipment 114A sends the user equipment capabilities to the network.

In some example embodiments, the Scell activation time and/or Scell activation delay may be sent to the network 110A, for example, after the user equipment 114A receives the Scell configuration and/or Scell activation command at 202 for Scell 112A. The user equipment 114A may respond, in some example embodiments, with some signaling including indication of the Scell activation time and/or Scell activation delay. This may be performed using user equipment capability signaling, for example. Accordingly, network 110A may schedule user equipment 114A promptly, when the Scell is actually activated and operational (which may not be possible with a Scell activation loosely specified by a standard requirement, as some user equipment might be faster or slower).

Although the previous example describes the Scell activation time and/or Scell activation delay being sent to the network as part of for example the capabilities signaling of the user equipment, the Scell activation time and/or the Scell activation delay may also be sent to the network at other times as well and using signaling other than capability related signaling.

In some example embodiments, the user equipment may signal at 204 the Scell activation time and/or Scell activation delay dynamically, such as for example at connection establishment or when being configured with carrier aggregation, Scell configuration and/or Scell activation, for example. To illustrate, the user equipment 114A may send at 204 the Scell activation time and/or the Scell activation delay using radio resource control (RRC) signaling. In the case or RRC signaling, the Scell activation time and/or the Scell activation delay may be included as an indication from network that user equipment supplies the Scell activation delay and/or activation time, user equipment signaling in the uplink that the Scell activation delay/time upon receiving the Scell configuration, and/or any other signaling mechanism. And, the Scell activation time and/or Scell activation delay time may vary with a given user equipment (for example, depending on how many Scells are activated, the frequency or frequency band of the cells, and the like), so dynamic signaling may allow the same user equipment to vary the Scell operational delay and/or Scell activation time reported to the network.

In some example embodiments, the user equipment may signal at 204 the Scell activation time and/or Scell activation delay dynamically, such as for example at carrier aggregation establishment or configuration. For example, user equipment 114A may send at 204 the Scell activation time and/or the Scell activation delay during radio resource control signaling used to set up carrier aggregation (for example, when the user equipment is configured with carrier aggregation or Scell). In some example embodiments, the Scell activation time and/or the Scell activation delay may be signaled via the RRCConnectionReconfiguration including the sCellToAddModList field, although other messages/signaling types may be used as well.

Moreover, although some of the examples described herein refer to sharing signaling resources (for example, by augmenting existing RRC signaling) in order to provide the Scell activation time and/or Scell activation delay to the network, the Scell activation time and/or serving cell activation delay may be signaled via dedicated signaling as well.

In some example embodiments, the user equipment 114A may signal at 204 the Scell activation time and/or Scell activation delay on a per individual Scell basis, so that each Scell accessed by the user equipment 114A may be associated with a separate Scell activation time and/or Scell activation delay.

At 206, the Scell may be active, in accordance with some example embodiments. For example, Scell 112A may be considered active and/or operational when the Scell activation time/delay occurs (for example, as signaled at 204). At 208, the user equipment 114A may report measurements to the network 110A during the Scell delay period 294, in some example embodiments. At 210, the Scell may be operational, in accordance with some example embodiments. For example, Scell 112A may be considered operational when the Scell delay time occurs (for example, as signaled to the network at 204).

Figure 4:
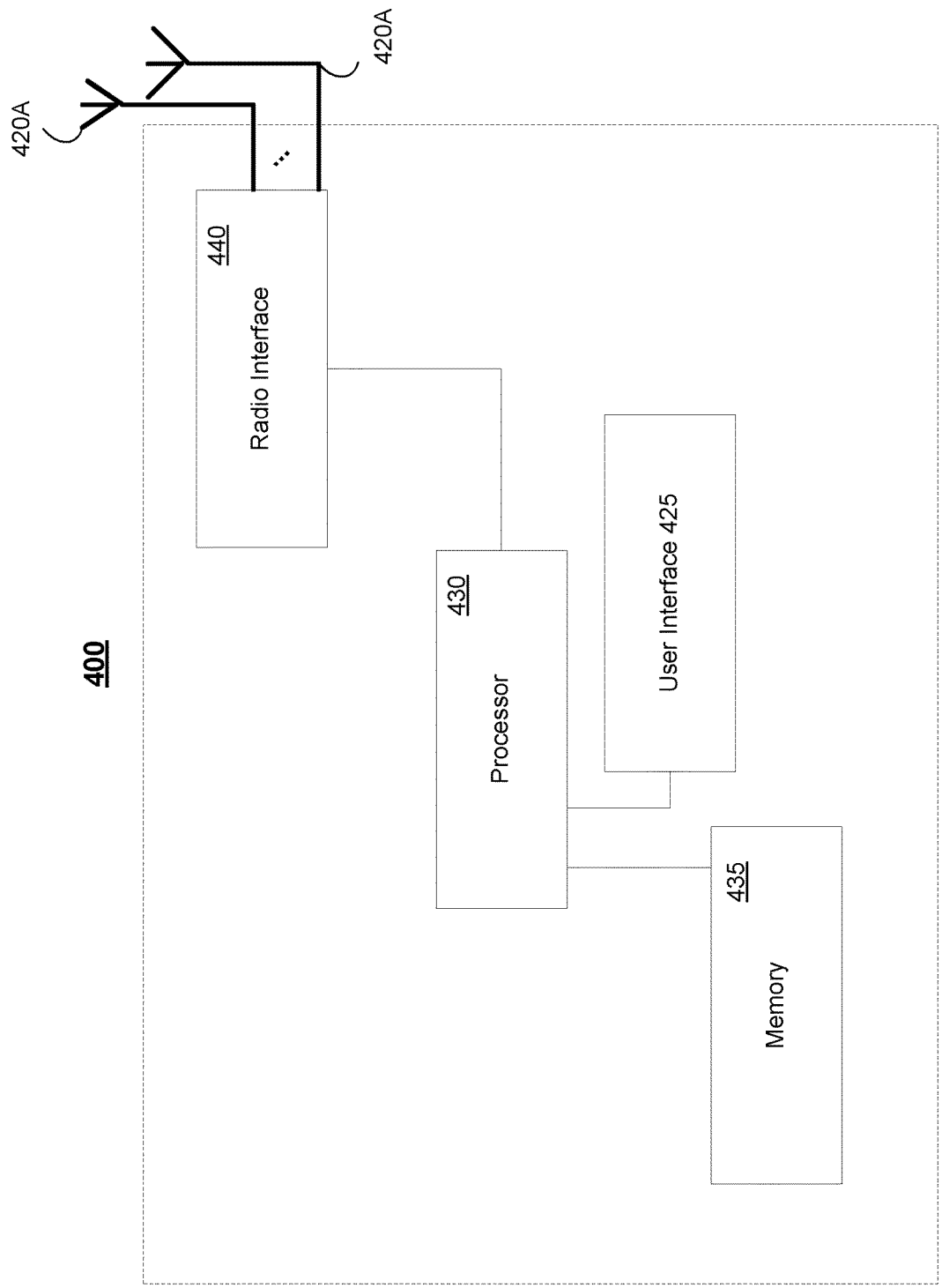
FIG. 4 depicts an example of a radio, in accordance with some example embodiments.

FIG. 4 depicts a block diagram of a radio 400 that may be used at user equipment 114A-B, in accordance with some example embodiments. The user equipment may include one or more antennas 420 for receiving a downlink and transmitting via an uplink. The user equipment 400 may also include a radio interface 440 (also referred to as a modem) coupled to the antenna 420. The radio interface 440 may correspond to a plurality of radio access technologies including one or more of LTE, WLAN, Bluetooth, BT-LE, NFC, RFID, UWB, ZigBee, and the like. The radio interface 440 may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink. The user equipment 400 may further include a user interface 425, at least one processor, such as processor 430, for controlling user equipment 400 and for accessing and executing program code stored in memory 435. In some example embodiments, the memory 435 includes code, which when executed by at least one processor causes one or more of the operations described herein with respect to user equipment, such as process 200 and the like. For example, the user equipment may perform one or more of the following operations: receive Scell activation commands, receive Scell configuration information, signal to the network the Scell activation time, signal to the network the Scell activation delay, and/or perform any other operations associated with the user equipment disclosed herein.

Figure 5:
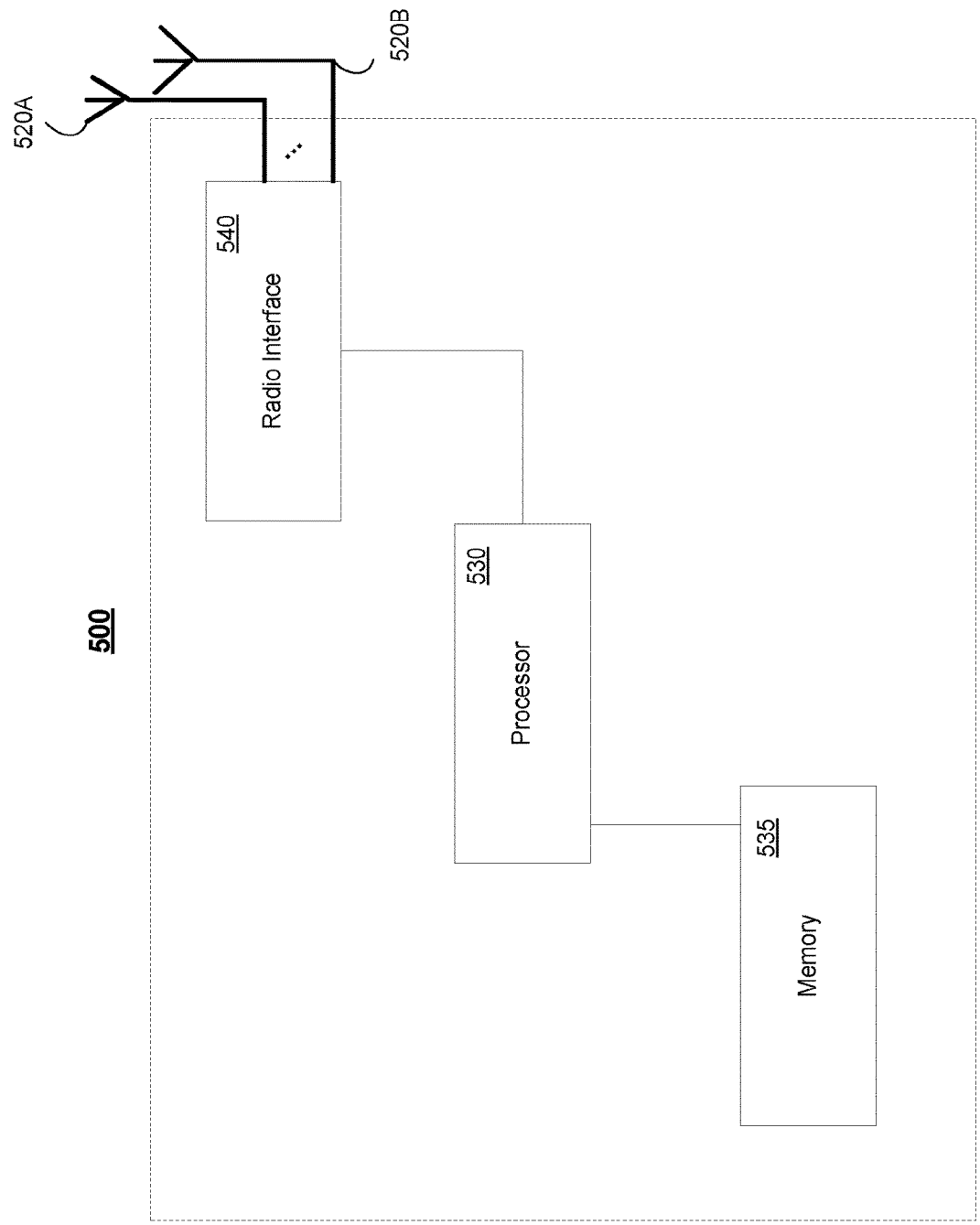
FIG. 5 depicts an example of an access point, in accordance with some example embodiments.

FIG. 5 depicts an example implementation of a wireless access point 500, which may be implemented at one or more of base stations 110A-C, in accordance with some example embodiments. The wireless access point may include one or more antennas 520 configured to transmit via downlinks and configured to receive uplinks via the antenna(s) 520. The wireless access access point may further include a plurality of radio interfaces 540 coupled to the antenna(s) 520. The radio interfaces 540 may correspond to a plurality of radio access technologies including one or more of LTE, WLAN, Bluetooth, BT-LE, NFC, radio frequency identifier (RFID), ultrawideband (UWB), ZigBee, and the like. The radio interface 540 may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). The wireless access point may further include one or more processors, such as processor 530, for controlling the wireless access point 500 and for accessing and executing program code stored in memory 535. In some example embodiments, the memory 535 includes code, which when executed by at least one processor, causes one or more of the operations described herein with respect to the base stations/wireless access points. For example, the wireless access point 500 may be configured to send the Scell activation command, send the Scell configuration, receive the signaled Scell activation time and/or Scell activation delay, and the like.

Without in any way limiting the scope, interpretation, or application of the claims appearing herein, a technical effect of one or more of the example embodiments disclosed herein may, in some example implementations, comprise enhanced user equipment and network performance including better utilization of resources, reduced power consumption, and the like.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

The different functions discussed herein may be performed in a different order and/or concurrently with each other. Furthermore, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications, which may be made without departing from the scope of the present invention as, defined in the appended claims. The term "based on" includes "based on at least."

What is claimed:

1. An apparatus comprising:
   at least one processor; and
   at least one memory including computer program code for one or more programs, the at least one processor, the at least one memory, and the computer program code configured to cause the apparatus to at least:
   receive a channel measurement report from a user equipment;
   determine a receipt of the channel measurement report to indicate a time that a secondary cell is active at the user equipment and a readiness at the user equipment to access the secondary cell,
   wherein the readiness comprises a delay from the time the secondary cell is active to a time the secondary cell is operational, and
   wherein the delay is of fixed value of 24 terminal timing intervals (TTIs) for the user equipment.

2. The apparatus as recited in claim 1, wherein the apparatus comprises at least one of a base station and a network node of a wireless access network.

3. The apparatus as recited in claim 1, wherein the channel measurement report comprises a channel quality indicator report.

4. A method comprising:
   receiving a channel measurement report from a user equipment; and
   determining a receipt of the channel measurement report to indicate a time that a secondary cell is active at the user equipment and a readiness at the user equipment to access the secondary cell,
   wherein the readiness comprises a delay from the time the secondary cell is active to a time the secondary cell is operational, and
   wherein the delay is of fixed value of 24 terminal timing intervals (TTIs) for the user equipment.

5. The method as recited in claim 4, wherein the method is performed by at least one of a base station and a network node of a wireless access network.

6. The method as recited in claim 4, wherein the channel measurement report comprises a channel quality indicator report.

7. A computer program product comprising at least one non-transitory computer-readable storage medium having executable computer-readable program code portions stored therein, the computer-readable program code portions comprising:
   a first program code portion configured to receive a channel measurement report from a user equipment; and
   a second program code portion configured to determine a receipt of the channel measurement report to indicate a time that a secondary cell is active at the user equipment and a readiness at the user equipment to access the secondary cell,
   wherein the readiness comprises a delay from the time the secondary cell is active to a time the secondary cell is operational, and
   wherein the delay is of fixed value of 24 terminal timing intervals (TTIs) for the user equipment.

8. The computer program product as recited in claim 7, wherein the program code portion is performed by at least one of a base station and a network node of a wireless access network.

9. The computer program product as recited in claim 7, wherein the channel measurement report comprises a channel quality indicator report.

10. An apparatus, comprising:
    at least one processor; and
    at least one memory including computer program code for one or more programs, the at least one processor, the at least one memory, and the computer program code configured to cause the apparatus to at least:
    transmit a channel measurement report for a secondary cell;
    determine a time with the transmission of the channel measurement report that a secondary cell is active at the apparatus and a readiness for the apparatus to access the secondary cell,
    wherein the readiness comprises a delay from the time the secondary cell is active to a time the secondary cell is operational, and
    wherein the delay is of fixed value of 24 terminal timing intervals (TTIs).

11. The apparatus as recited in claim 10, wherein the apparatus comprises a user equipment.

12. The apparatus as recited in claim 10, wherein the channel measurement report comprises a channel quality indicator report.

13. A method, comprising:
    transmitting, by a user equipment, a channel measurement report for a secondary cell;
    determining a time with the transmission of the channel measurement report that a secondary cell is active at the user equipment and a readiness for the user equipment to access the secondary cell,
    wherein the readiness comprises a delay from the time the secondary cell is active to a time the secondary cell is operational, and
    wherein the delay is of fixed value of 24 terminal timing intervals (TTIs).

14. The method as recited in claim 3, wherein the channel measurement report comprises a channel quality indicator report.

15. A computer program product comprising at least one non-transitory computer-readable storage medium having executable computer-readable program code portions stored therein, the computer-readable program code portions comprising:
    a first program code portion configured to transmit a channel measurement report for a secondary cell;
    a second program code portion configured to determine a time with the transmission of the channel measurement report that a secondary cell is active at a user equipment and a readiness for the user equipment to access the secondary cell,
    wherein the readiness comprises a delay from the time the secondary cell is active to a time the secondary cell is operational, and wherein the delay is of fixed value of 24 terminal timing intervals (TTIs).

* * * * *